Figure 1:
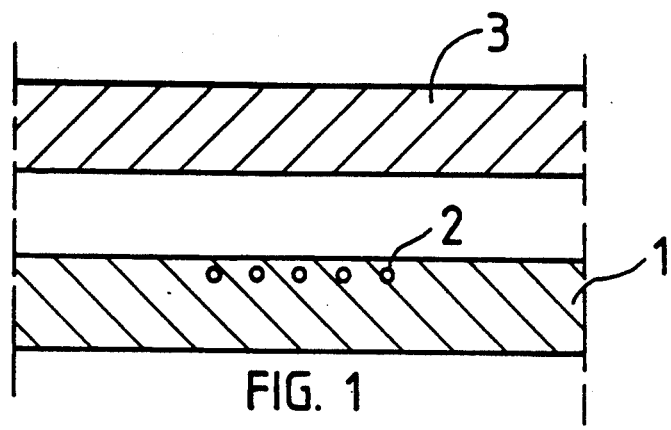

United States Patent [19]

Oikari et al.

[11] Patent Number: 5,198,364
[45] Date of Patent: Mar. 30, 1993

[54] METHOD FOR PERFORMING LIQUID SCINTILLATION COUNTING AND DETECTION MATERIAL

[75] Inventors: Timo Oikari; Tapio Yrjönen, both of Turku, Finland

[73] Assignee: Wallac Oy, Turku, Finland

[21] Appl. No.: 689,764

[22] PCT Filed: Dec. 1, 1989

[86] PCT No.: PCT/FI89/00219
§ 371 Date: May 30, 1991
§ 102(e) Date: May 30, 1991

[87] PCT Pub. No.: WO90/06525
PCT Pub. Date: Jun. 14, 1990

[30] Foreign Application Priority Data
Dec. 1, 1988 [FI] Finland .................................. 885610

[51] Int. Cl.⁵ ............................................ G01N 23/00
[52] U.S. Cl. ...................... 436/57; 250/328; 250/364
[58] Field of Search ..................... 436/57, 58, 59; 250/328, 362, 364

[56] References Cited

U.S. PATENT DOCUMENTS

| | | | |
|---|---|---|---|
| 4,488,046 | 12/1984 | Bernstein | 250/474.1 |
| 4,764,677 | 8/1988 | Spurney | 250/368 X |
| 4,972,084 | 11/1990 | Potter et al. | 250/364 |

FOREIGN PATENT DOCUMENTS

WO89/11664  11/1989  PCT Int'l Appl. .

*Primary Examiner*—James C. Housel
*Assistant Examiner*—Maureen M. Wallenhorst
*Attorney, Agent, or Firm*—Armstrong & Kubovcik

[57] ABSTRACT

A method for performing liquid scintillation counting by the liquid scintillation counter that measures radioactive samples on a measurement support, such as a filter plate or alike, which has the sample associated therein. According to the method, the detection material, such as scintillator, is added to the measurement support before the measurement. The method according to the invention is characterized by adding detection material, such as scintillator, in melted form into the measurement support and performing the measurement after the detection material has solidified. On the filter plate is added for instance a mixture of paraffin and scintillator. One component in the detection material can be plastic scintillator.

12 Claims, 1 Drawing Sheet

METHOD FOR PERFORMING LIQUID SCINTILLATION COUNTING AND DETECTION MATERIAL

The object of the invention is a method for performing liquid scintillation counting by the liquid scintillation counter that measures radioactive samples on a measurement support, such as a filter plate or alike, which has the sample associated therein, according to which method the detection material, such as scintillator, is added to the measurement support before the measurement.

The invention relates to liquid scintillation counting directly on a filter plate. A liquid scintillation counter of this kind is manufactured by e.g. the applicant Wallac Oy with the trade name 1205 Betaplate. With this instrument samples labeled with radioactive markers are measured, said samples being located on a filter plate or on other corresponding plate. The size of the filter plate used by the applicant is about 10 cm×25 cm. The samples are situated on the plate in 16 rows so that each row contains 6 samples. The total number of samples is 96. Each sample covers an area with the diameter of 9 mm.

According to a known method the filter plate having the samples to be measured is put into a flat plastic bag and about 10 ml of liquid scintillant is added. The bag is sealed e.g. with a heat sealer and inserted into a measureing cassette of 1205 Betaplate. The liquid scintillant converts part of the radioactive energy emitted from the samples into light that is measured by the photomultiplier tubes of the liquid scintillation counter.

A drawback with this known method has been that in some cases the samples on the filter plate have been noticed to gradually dissolve into the liquid scintillant. If the samples then get intermixed, serious errors are introduced in the measurement.

The object of the present invention is to produce a new method and a new detection material for liquid scintillation counting. The method according to the invention is characterized by adding detection material, such as scintillator, in melted form into the measurement support and performing the measurement after the detection material has solidified.

The detection material according to the invention is characterized in that said detection material is easily melting material that solidifies before the measurement. A plateshaped solid scintillating plate to be melted into the filter plate removes the problem mentioned above, because the samples do not dissolve in the solidified scintillating plate.

The other characteristics of the invention are presented in the patent claims below.

The invention is explained with enclosed drawings wherein

FIG. 1 presents detection material plate and filter plate on which the samples are situated.

Figure 2:
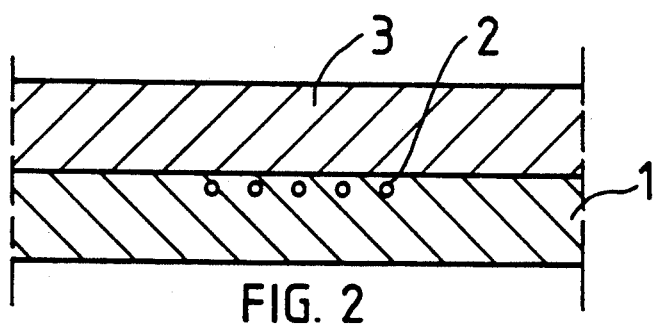

FIG. 2 presents the plates of FIG. 1 placed on each other.

Figure 3:
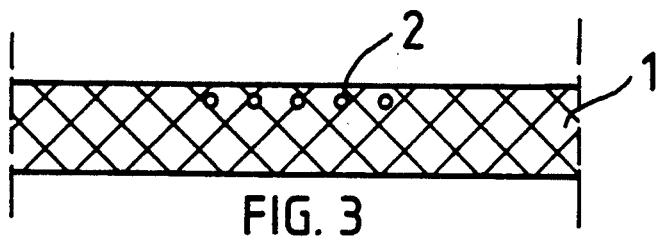

FIG. 3 presents the filter plate of FIG. 2 having the detection material plate melted therein.

The detection material according to the invention is used in the following way:

The filter plate 1, on which the samples to be determined reside, is put into a flat plastic bag, into which the mentioned solid detection material, such as a scintillating plate, is added, said scintillating plate being of about same size as the filter plate. The thickness of the scintillating plate is e.g. about 1-2 mm. After this the solid scintillating plate 3 is melted into the porous filter plate with e.g. a hot metal plate. Upon melting the liquid formed by the scintillating plate penetrates so close to the radioactive sample molecules that the radiation and the scintillator material of the scintillating plate can interact. After melting the system is cooled to room temperature, whereafter the material of the scintillating plate is solid again and the samples can not dissolve into it. As a result of interaction process part of the radiation energy emitted by molecules is converted to light that is measured with the mentioned liquid scintillation counter.

According to an advantageous embodiment of the scintillating plate, it consists of at least two components, of which at least one acts as a so called carrier and the other components, the number of which is at least one, act as actual scintillators that convert part of the energy of the radioactive radiation to light in interaction process between radiation and scintillator.

The carrier material is solid at room temperature, but melts at reasonably low temperature, e.g. about 100° C. A substance of this kind is e.g. paraffin. The other components in the scintillating plate are well known, such as plastic scintillators, organic scintillators like anthracene or inorganic scintillators like zinc sulphide. The plastic scintillators typically comprise an aromatic base plastic into which a small amount of organic scintillators are dissolved. Common base plastics are polystyrene and polyvinyltoluene. The inventors have found that it is possible to get a homogeneous mixture of e.g. plastic scintillators and paraffin or of scintillators and paraffin by heating them to a sufficiently high temperature and mixing them together. From this mixture it is possible to prepare, e.g. by casting, sufficiently thick plates that are solid at room temperature and used as described above.

The invention is not limited in the above description, but it includes all melting scintillating plates and bodies of other shapes that comprise at least two components of which at least one is easily melting material and at least one is scintillator.

We claim:

1. A method for performing liquid scintillation counting by a liquid scintillation counter comprising the steps of applying radioactive samples to a porous measurement support, associating a detection material in the form of a solid scintillating plate with a surface of the measurement support to which the samples have been applied, melting the solid scintillating plate into the porous measurement support thereafter, cooling the measurement support and scintillating plate so that the scintillating plate becomes solid again after the step of melting, and measuring the radioactivity of the samples on the measurement support with a liquid scintillation counter.

2. The method according to claim 1 wherein the detection material is a mixture of easily melting material and scintillator.

3. The method according to claim 1 wherein the detection material is a mixture of paraffin and scintillator.

4. The method according to claim 1, wherein the detection material is an easily melting material.

5. The method according to claim 4, wherein the detection material is a mixture of easily melting material and scintillator.

6. The method according to claims 4 or 5, wherein the detection material comprises at least two components, at least one of which is an easily melting material and at least one of which is a scintillator.

7. The method according to claim 5, wherein the easily melting material is paraffin.

8. The method according to claim 5, wherein the scintillator in the detection material is a plastic scintillator.

9. The method according to claim 8, wherein the plastic scintillator is characterized by a base plastic of polyvinyltoluene.

10. The method according to claim 8, wherein the plastic scintillator is characterized by a base plastic of polystyrene.

11. The method according to claim 4, wherein the detection material is an organic scintillator.

12. The method according to claim 4, wherein the detection material is an inorganic scintillator.

* * * * *